June 22, 1943.  S. K. LACKOFF ET AL  2,322,369
TALKING MOTION PICTURE PROJECTOR
Filed Feb. 19, 1941  3 Sheets-Sheet 1
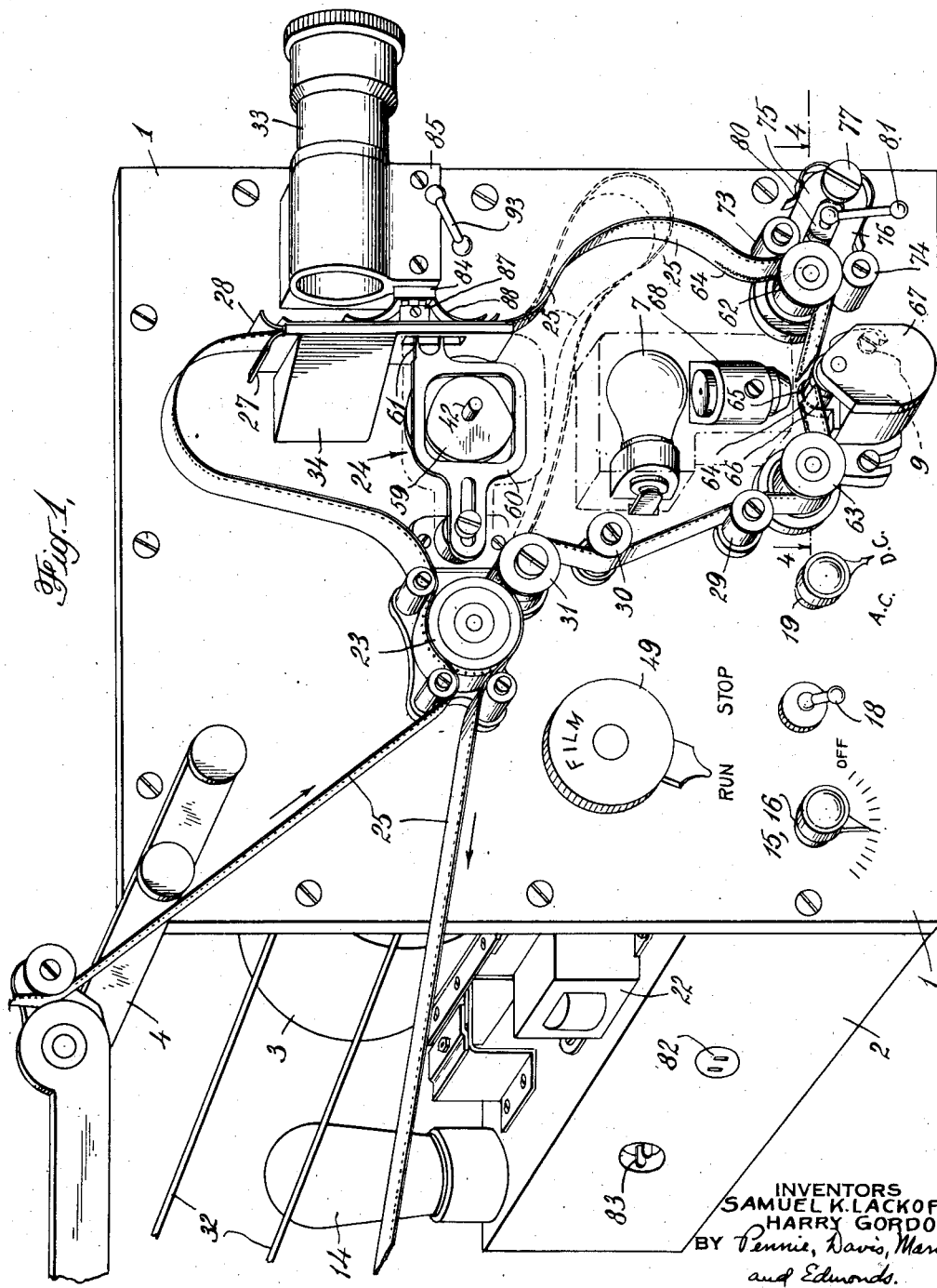
INVENTORS
SAMUEL K. LACKOFF
HARRY GORDON
BY Pennie, Davis, Marvin
and Edmonds.
ATTORNEYS

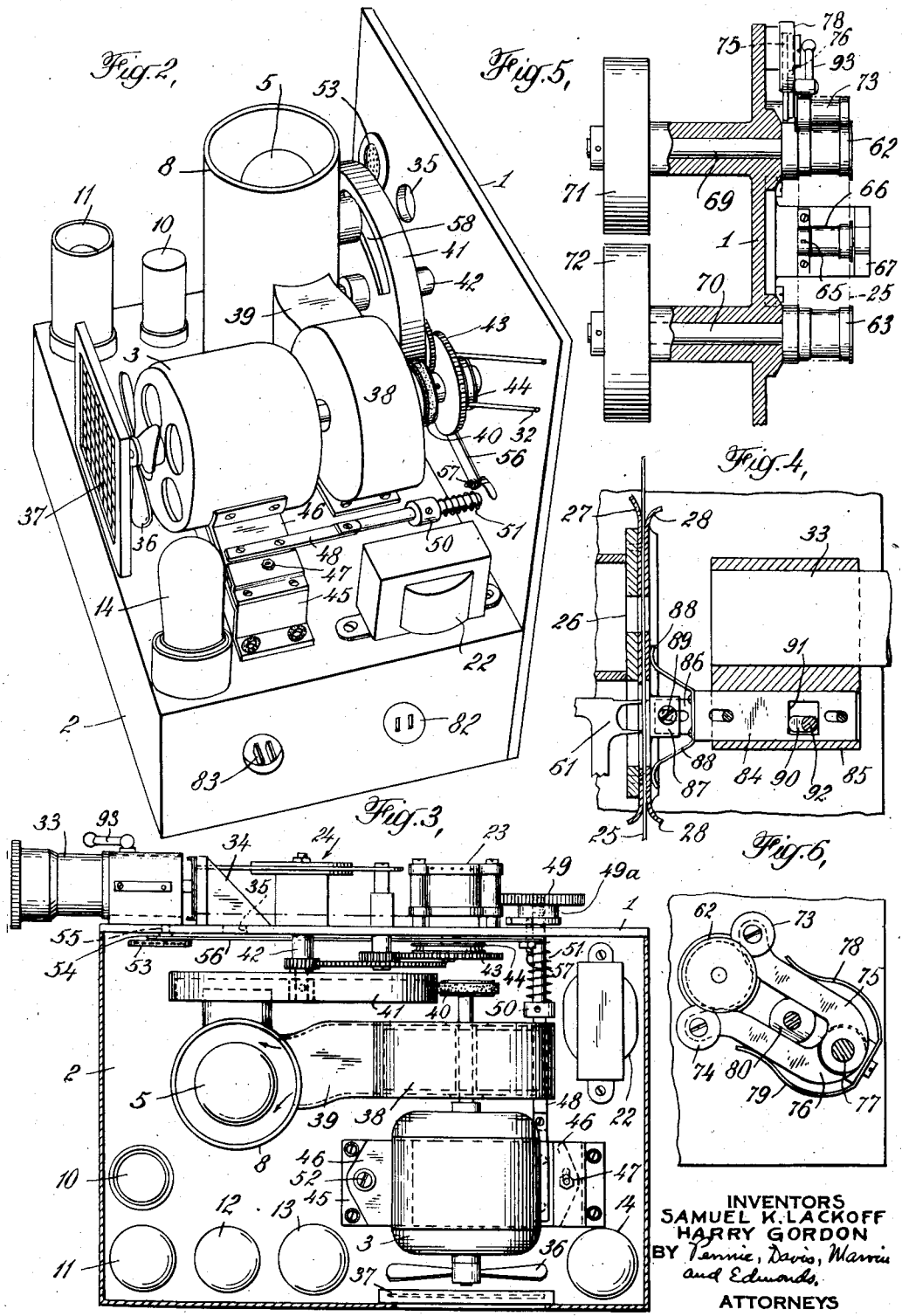

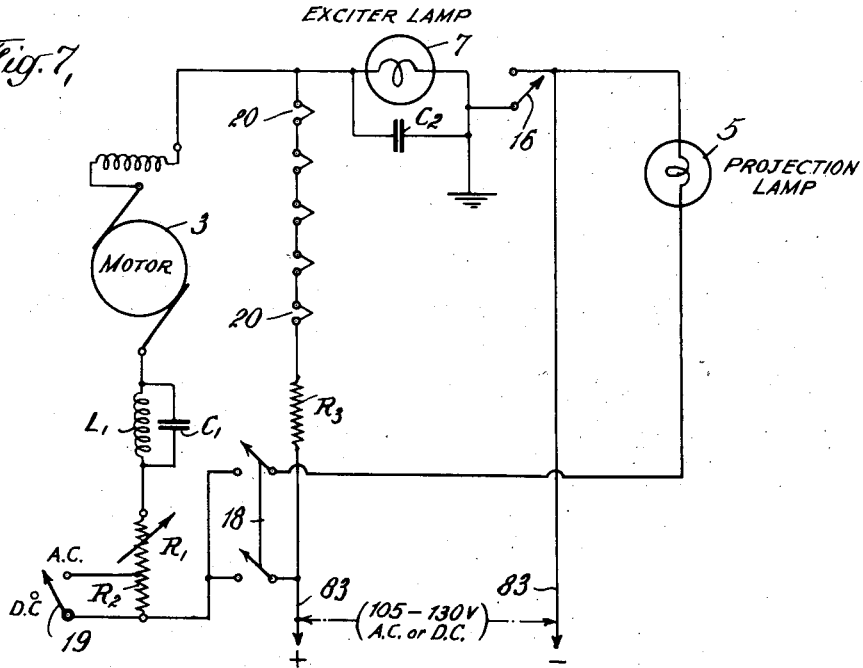
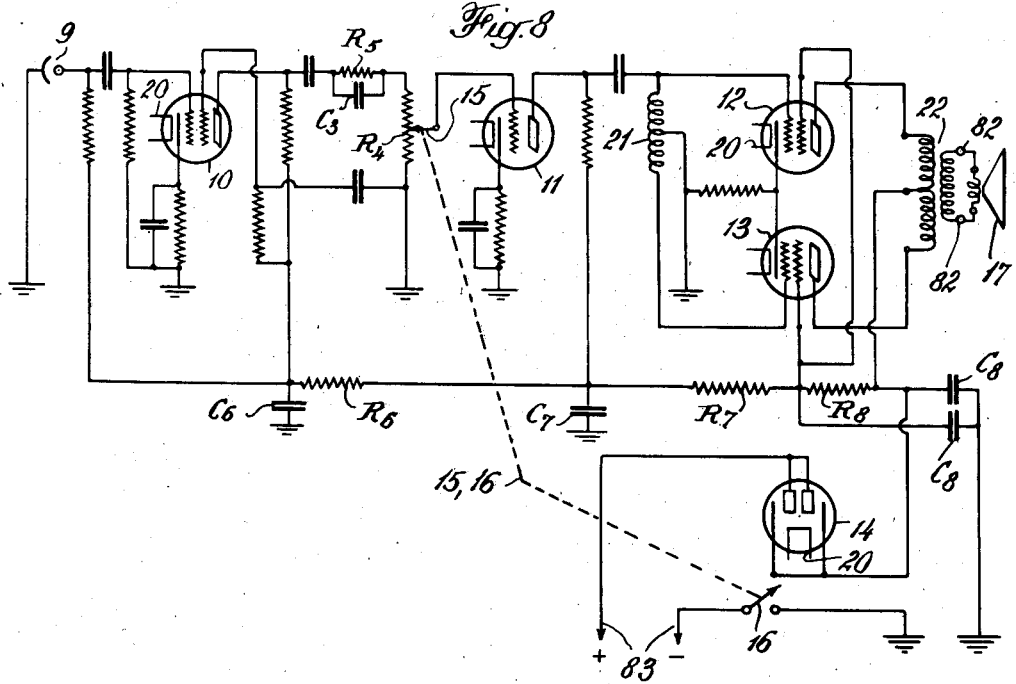

Patented June 22, 1943

2,322,369

UNITED STATES PATENT OFFICE 2,322,369

TALKING MOTION PICTURE PROJECTOR

Samuel K. Lackoff, New York, and Harry Gordon, Brooklyn, N. Y., assignors to Russell Goldman, New York, N. Y.

Application February 19, 1941, Serial No. 379,810

6 Claims. (Cl. 88—16.2)

The present invention relates to motion picture projectors, and is especially applicable to projectors of the type equipped to accommodate motion picture film bearing a sound track. Such projectors are frequently called taking motion picture projectors. While the improvements according to the present invention are applicable to any motion picture projector, it is at present contemplated that most of them will be found particularly useful in connection with projectors of the portable type using film of 16 mm. width, or thereabouts.

Motion picture projectors of the portable type, such for example as have come into extensive use for "silent home movies," have been simplified to a degree making practicable a projector of small dimensions and fairly reasonable cost. However the additional and complicated equipment required to provide for the reproduction of sound-film has heretofore resulted in a machine too elaborate and expensive to meet with popular demand. It is, therefore, the object of the present invention to simplify and improve the mechanism both with respect to reproduction of pictures and with respect to the reproduction of sound recorded on the film, so that the entire machine may be reliable and simple to operate, and be also sufficiently compact and inexpensive to compete with motion picture projectors already on the market which are not equipped for sound reproduction.

The various features of the invention can best be appreciated and understood in connection with the following description considered in connection with the drawings, wherein:

Fig. 1 is a perspective view of the front of the vertical panel of the projector with two apparatus covers removed;

Fig. 2 is a perspective view showing the apparatus in the rear of the vertical panel;

Fig. 3 is a plan view of the projector;

Fig. 4 is a sectional view of the portion of the apparatus shown in Fig. 1 which includes the film gate and the mechanism appertaining thereto;

Fig. 5 shows a sectional view taken through the line 4—4 of Fig. 1 and illustrates the mechanism which drives the film at a constant speed for sound track pickup;

Fig. 6 shows detailed view of the mechanism associated with the spring rollers which cooperate with one of the impedance rollers illustrated in Fig. 4;

Fig. 7 is a circuit diagram of the power system which includes the driving motor, the exciter lamp and the projection lamp, and the vacuum tubes included in the sound amplifier; and Fig. 8 is a circuit diagram of the sound amplifier proper, including a rectifier and loud speaker.

Referring to Figs. 1 and 2, the mechanism customarily found in motion picture projectors of the small, portable type, will be mentioned first. A motor 3 is coupled through certain novel gearing, later to be described, to a film-driving sprocket 23 and a reciprocating cam mechanism 24 imparting the required intermittent motion to the film 25 as it passes through the friction gate 27, 28. At the rear of the film as it passes through the friction gate is a friction gate shoe 27 which is stationary, and on the front side of the film is a friction gate shoe 28 which is spring pressed and movable toward and away from the film, as will later be described in more detail because it includes certain novel features.

After leaving the friction gate 27, 28 the film is guided by appropriate rollers through the mechanism shown in the lower part of vertical panel 1, Fig. 1, which includes the sound pickup device and mechanism for passing the film therethrough at uniform speed, and thence over the guide rollers 29, 30 and 31 to the under side of film-driving sprocket 23 which serves to pull the film through the mechanism just outlined. After leaving sprocket 23 the film is guided by suitable rollers to a take-up reel (not shown) which is mounted on reel support bracket 4. The take-up reel is driven by a driving belt 32 which is coupled to the motor 3 by a suitable pulley 44 (Fig. 2). It is understood, of course, that a supply reel (not illustrated) is likewise supported on the bracket 4, and that the film is drawn from such supply reel by power exerted by the sprockets on sprocket wheel 23 as they engage the sprocket holes in the film pasing over the top thereof. In addition to the apparatus above described, there are shown in Fig. 1 the usual barrel 33 enclosing the projection lenses, and a 45° mirror (not shown) enclosed in the mirror case 34. The 45° mirror, which could be replaced by a suitable reflecting prism, is secured to the front of panel 1 so as to receive the light from the projection lamp which passes through a hole 35 (Fig. 2) in panel 1 and after reflection, passes through the usual projection lenses in lens barrel 33.

Referring now to Fig. 2, a driving motor 3 is illustrated approximately in the center. To the left of the motor is shown a fan 36 secured to an extension of the motor shaft. This fan serves to draw cooling air through a fan guard 37 to cool the motor, and also to cool the remainder of the apparatus on the same side of panel 1, especially in the event that the entire projector with its mechanism is enclosed in a suitable cabinet, as would usually be the case. On the right hand end of the motor, as viewed in Fig. 2, is a blower 38 which is mounted on an extension of the motor shaft and which is connected through an air duct 39 to the interior of the projection lamp housing 8. The air intake for the blower 38 is preferably on the side away from the motor. Thus, assuming that the apparatus is enclosed in a cabinet, cooling air is drawn in through the guard 37 by fan 36, and after circulating through the motor and through the interior of the cabinet is drawn into the blower 38, and thence at considerable velocity is forced upwardly past the projection lamp 35 and out through an appropriate hole in the top of the cabinet above the lamp. As will later be described in connection with Fig. 7, the electric control switches are so arranged that the projection lamp, which generates a large amount of heat, cannot be lighted unless the blower is running.

The power of film-driving mechanism is shown in Figs. 2 and 3. On the end of the extension of the motor shaft to which the blower 38 is attached is secured a friction wheel 40 which, as illustrated, is in driving engagement with the rim of flywheel 41. In the illustrated embodiment the flywheel has a diameter about four times that of the friction wheel. The flywheel 41 is secured to an axle 42 which passes through a bearing in panel 1 and serves to drive the intermittent film-moving mechanism 24. Secured to this same axle 42 is shown the first of a train of four gears of which the fourth is the gear wheel 43, which, in turn, is secured to an axle passing through a bearing in panel 1 and which drives sprocket wheel 23 at a speed suitably reduced from that of axle 42. Also secured to the axle driven by gear wheel 43 is a pulley 44 which supplies power to the belt 32 which, in turn, drives the take-up reel previously mentioned.

The driving motor 3 is mounted as shown in Fig. 2 on a motor block 45 which may be constructed in any convenient manner. Because of the proximity of the amplifier to the motor it is advisable to insulate the chassis from motor vibrations. Therefore, the motor block may be mounted with the aid of rubber grommets, for example, extending through the holes in the chassis 2 through which pass bolts securing the motor block to the top of the chassis. Above motor block 45 is a bed-plate 46 suitably secured to the motor frame. This bed-plate is not permanently secured to the motor block but is arranged to slide on the face thereof. The sliding motion of the bed-plate may be limited by a slot therein through which a screw 47 passes into the top of the motor block. Firmly secured to the motor bed-plate is a traction rod 48 which passes through panel 1 and terminates in a control knob 49 (Figs. 1 and 3). Traction rod 48 terminates in a threaded portion on which knob 49 is screwed. A suitable bearing plate or washer should be provided between the inner shoulder 49a of knob 49 and the front surface of panel 1 to receive the thrust of the shoulder of the knob against the panel at this point. Traction rod 48 is so secured that it cannot rotate, and it also is provided with a spring stop 50 preferably adjustable along the axis of rod 48. Between the stop 50 and the inside of panel 1 is a compression spring 51 which tends to pull the inside shoulder 49a of knob 49 against panel 1 and thus tends to push traction rod 48 rearwardly when knob 49 is turned in a direction to unscrew it. From Fig. 3 it is clear that the end of bed-plate 46 remote from rod 48 (at the left end in Fig. 3), and which may comprise a separate piece of material, if desired, is pivoted in the center around the motor pivot 52 which is driven into the motor block 45. Thus, when motor control knob 49 is turned, traction rod 48 is moved in or out of the panel and the entire motor is swung on its supporting block a small distance. This slight movement of the motor is sufficient to move friction wheel 40 so as to disengage or engage with the rim of flywheel 41. By this means the motion of the film may be started and stopped at will without stopping the motor and the blower thereto attached. In effecting this control the motor shaft swings horizontally such a small distance that the holes in the housing of blower 38 through which the motor shaft passes are large enough to clear the shaft at both extremes of its swing and no interference with the action of the blower results.

It is well understood that when the film in a motion picture projector is stopped while the projection lamp is illuminated so as to show on the projection screen a single picture or frame, there is danger of scorching or burning that portion of the film which is being projected. Thus, in many motion picture projectors there is provided a suitable heat filter which may be manually inserted in the light beam between the projection lamp and the film so as to absorb enough heat as to prevent damage to the film. In accordance with the present invention the insertion of such a heat filter is provided automatically so that whenever friction wheel 40 is disengaged from the rim of flywheel 41, thus stopping the motion of the film, a suitable heat filter is automatically interposed in the light beam from the projection lamp. Mechanism to accomplish this is illustrated in Figs. 2 and 3 wherein is shown a filter 53, which may comprise a screen of fine brass wire, secured at the upper end of a vertical arm 54 behind panel 1 and arranged to swing parallel to the panel on a pivot 55 at the lower end of the arm. This pivot may be secured to the panel or to the chassis vertically below the filter 53 as indicated in Fig. 3. A connecting rod 56 pivoted to arm 54 just above pivot 55 runs across the back of panel 1 parallel therewith and terminates at a pin 57 passing through a suitable slot in panel 1 (Fig. 2). This pin may conveniently be secured in the piece from which the pointer on knob 49 is formed (Fig. 1). From the foregoing description it will, therefore, be clear that when knob 49 is rotated, pin 57 is swung in one direction or the other in its slot through panel 1, thus moving connecting rod 56 longitudinally and swinging filter arm 54 a sufficient distance to allow filter 53 either to cover or uncover the hole 35 in panel 1 through which light from the projection lamp is directed. In that manner, filter 53 is swung across hole 35 to filter out excess heat from the light passing therethrough whenever friction wheel 40 is moved out of frictional engagement with flywheel 41.

The friction gate and the mechanism for opening it and for applying the required friction to the film as it is drawn therethrough are illustrated in Fig. 4. In this figure are shown the rear or stationary friction gate shoe 27 and the front or movable friction gate shoe 28. The light gate through which the light passes where it is projected through the film is shown at 26, and the projection lens barrel is represented in cross-section at 23. Beneath lens barrel 33 is a mechanism for moving the movable friction shoe 28 toward and away from the film.

In accordance with the present invention, the movable gate shoe 28 remains in open or closed position until moved to the opposite position, thus leaving both of the operator's hands free for threading the film. Reverting for the moment to Fig. 1, this movement may be accomplished manually by swinging lever 93, which draws slide bar 84 in or out of slideway 85. In Fig. 4, slideway 85 is shown to comprise a guide for bar 84. A portion of bar 84 is cut out as shown at 91, and this cutout portion functions as a cam follower cooperating with cam 90. By swinging lever 93, above mentioned, cam shaft 92 and cam 90 are rotated, thus sliding the bar 84 either toward or away from the film. The motion of the slide bar may be further guided if required, for example by pins in the back of the slideway and slots in the bar, which are likewise illustrated in Fig. 4. To the movable friction gate shoe 28 is secured at right angles a face plate 87 adapted to slide over an extension piece 86, the face plate and the extension piece being held adjacent by a suitable pin or rivet 89. If desired, the face plate may be formed double so that the extension piece 86 slides between two face plates. The construction here described also requires a suitable slot in extension piece 86 in which pin 89 may travel. Secured to one end of bar 84 are a pair of springs 88 which press against the outside surface of friction gate shoe 28. Thus when bar 84 is in the extreme left-hand position in Fig. 4, the friction gate shoe 28 is pressed against the film 25 with a resilient pressure exerted by the springs, also allowing the friction gate shoe 28 to move slightly away from its normal position; when, for example, a film splice passes through the friction gate. Rotation of cam 90 causes friction gate shoe 28 to be drawn sufficiently far away from stationary gate shoe 27 to facilitate threading of the projector.

A feature of the present invention which provides considerable simplification in construction, as well as simplification and reliability in operation of the device, is the feature which combines in one instrumentality the flywheel 41 and a shutter which is necessary in projectors of this type to interrupt the light beam from the projection lamp while the film is moving through the light gate 26. To this end the flywheel is positioned in front of the projection lamp and a portion of the web of the flywheel has been cut out as shown at 58 in Fig. 2, allowing the passage of the light beam during a revolution of a quadrant of the flywheel. There is also provided a corresponding cutout portion on the opposite quadrant of the flywheel, this second cutout portion being hidden in the illustration of Fig. 2. Thus the shutter proper comprises two quadrants of the web of flywheel 41. The simplification effected by combining the shutter and flywheel and by driving the flywheel directly by the friction wheel attached to the motor, the flywheel axle also being employed to drive the reciprocating mechanism, results in such an unusually efficient drive system that a driving motor of much less power, and hence smaller than customary is sufficient. Axle 42 on which flywheel 41 is secured extends through a suitable bearing in panel 1 to the opposite side thereof. The extension of axle 42 is illustrated in Fig. 1. Supported on it is a heart-shaped cam 59 which cooperates with follower 60 to give a reciprocating motion to the claws 61 which move the film 25 in intermittent motion through the friction gate. A cover, not shown, is preferably provided to enclose the reciprocating mechanism 24 just described.

If the projector is to be employed for projecting "silent" film it need not be threaded through the sound pickup mechanism next to be described, but may be threaded as shown by the dotted lines immediately beneath the mechanism 24 in such manner that after leaving the bottom of the friction gate 27, 28 a loop is formed, and thence the film passes over roller 31, under sprocket 23 and thence away to the take-up reel as described above.

In the event that the projector is to be used for reproducing talking pictures, the film should be threaded as indicated in solid lines in Fig. 1. As there illustrated, the film after leaving the friction gate 27, 28 forms a loop, then passes around negative impedance roller 62, over roller 66 which is mounted on the top of drum 67, then around positive impedance roller 63, and thence over rollers 29, 30 and 31 to sprocket wheel 23, the bottom portion of which engages the film and draws it over the rollers just enumerated. In order to press the film firmly on roller 66 the rollers 62 and 63 are preferably positioned as shown with the bottoms of rollers 62 and 63 below the top of roller 66.

As is customary in the art, an exciter lamp 7, provides a scanning beam which is properly proportioned and focused into a narrow beam by the optical system 68. This beam is focused on the sound track 64 which is provided along one edge of the film. Within the protecting drum 67 is a photoelectric cell 9, for which a suitable socket is provided on panel 1. The photoelectric cell is positioned so as to receive the fluctuations of light resulting from the passage of the sound track across the scanning beam projected from the optical system 68. This fluctuating light beam passes through a suitable scanning aperture 65 in drum 67 located beyond the film-supporting roller 66. For this purpose, roller 66 is constructed of such length that the sound track 64 on the film projects beyond the edge of the roller where it intercepts the light beam above mentioned. The construction is perhaps more clear in Fig. 5. A suitable light-tight cover, not shown in Fig. 1, should be secured to the panel 1 so as completely to enclose the exciter lamp 7 and optical system 8. An appropriate hole is provided in the bottom of the cover to allow the scanning beam from the optical system 6 to be projected on the sound track. Drum 67 is preferably constructed so as to be readily removable from the panel to afford access to the photoelectric cell which it encloses.

The impedance rollers 62 and 63 comprise an important part of the present invention because they provide a simple and effective means for assuring that the film shall travel across the beam at a constant speed which is essential for proper reproduction of the sound. A top view of these impedance rollers, together with the flywheels attached thereto, is shown in Fig. 5, partially in cross-section. From this figure it will be observed that each impedance roller 62 and 63 is secured to one end of an axle 69 and 70 which runs through a bearing in the panel 1, and that on the other end of each axle is secured a flywheel 71 and 72, respectively. In Fig. 5 may also be seen the relative positions of roller 66 and aperture 65, the latter being positioned beyond the end of the roller in an extension of drum 67 which raises the face of the aperture up to approximately the level of the top of roller 66.

The first impedance roller around which the film passes after leaving friction gate 27, 28 is the negative impedance roller 62, as previously stated. It is important that there should be substantially no slippage between the film and this roller during normal operation of the projector because at this point intermittent motion of the film through the friction gate must be changed to a continuous motion. The inertia of flywheel 71 attached to roller 62 will effect this change of motion providing the film is constrained to pass around the roller 62 without slipping. Therefore, a pair of tension rollers 73 and 74 are provided to press the film firmly against impedance roller 62 over a sufficient area to enable the inertia of the flywheel attached to roller 62 to impart a continuous motion to the film at that point. These tension rollers are each mounted on the end of a separate arm 75, 76, and the other ends of the arms are hinged on a single pivot 77. The tension rollers are pressed against impedance roller 62 by a U-shaped spring having free ends 78, 79 (see Fig. 6). Single springs could be employed if desired, but the choice of a U-shaped spring insures even pressure on both rollers. By thus mounting the tension rollers so as to be independent of each other, the rollers are free to swing independently to accommodate variations in thickness of the film, such as produced by a splice.

When the film is to be threaded through the machine it is convenient to have the tension rollers 73 and 74 spaced away from roller 62, so for this purpose a cam 80 is centrally pivoted between the roller arms 75 and 76. This cam has four flattened sides, so that when it is rotated by release lever 81 (Fig. 1) the arms 75, 76 are forced apart and will remain in that position until the release lever is moved in the opposite direction.

The positive impedance roller 63 with its flywheel 72 is also caused to rotate as the film passes around it. This positive impedance wheel tends to draw the film past the photoelectric cell at a uniform rate in spite of a tendency toward fluctuations in the speed with which the film is drawn away from roller 63 by sprocket 23. Thus, an impedance wheel is provided at each side of the photoelectric cell, the first or negative impedance wheel functioning to change the intermittent motion of the film into a constant motion before it reaches the photoelectric cell and the positive impedance roller assuring that this constant speed shall not be impaired by any tendency towards slight variation or vibration in the film transmitted backwards from the sprocket 23.

The electric circuit arrangements employed in the talking motion picture projector according to the present invention include several novel features which will now be described, it being recalled that for universal use, the machine should be operable from both alternating-current and direct-current power lines over a voltage range of about 105–130 volts. In Fig. 7 is shown the power circuit, and in Fig. 8 the sound or audio-frequency amplifier circuit. In these, as well as in all the other figures, like reference characters represent the same components or parts.

Referring to Fig. 7, the motor 3 which supplies the mechanical power for the projector is seen to be a series-wound motor which is connected in series with a speed-control resistor $R_1$. This resistor may preferably be of fixed value, or part or all of it may be adjustable, if required, by an accessibly located control knob to control the motor speed. Supplemental resistor $R_2$, which for alternating-current operation may be short-circuited by switch 19 (the control knob for which is shown on Fig. 1), is of suitable value to hold the motor to correct speed when the projector is operated on direct current. When the motor operates the projector mechanism through the drive system herein described and is connected in the electric circuit as shown, the change in motor speed is not excessive even without any adjustment of resistor $R_1$, though the line voltage fluctuates between the limits mentioned. A suitable receptacle 83 may be provided on the chassis 2 for connecting the projector to the power line.

Because of the electrical interference caused by the motor brush discharge, a suitable filter should be connected in the motor circuit. Such a filter may comprise, for example, a 3-millihenry inductance $L_1$ and a parallel condenser $C_1$ of 0.1 microfarad, but in any event should be designed to filter out the principal interfering frequency or frequencies developed when the motor is operating at a speed corresponding to normal picture projection. The exciter lamp 7 is connected in series with the motor 3 and the switches 16 and 18 to the line. Closure of switch 16 thus lights the exciter lamp if switch 18 is closed and the motor is running. A filter condenser $C_2$ of large capacity, such as 1.0 microfarad, is preferably connected across the exciter lamp to by-pass ripples and other line fluctuations which might otherwise result in hum or background noise in the sound system. As illustrated in Fig. 7, the cathode heaters or filaments 20 of the vacuum tubes are connected in series with a current-limiting resistor $R_3$, across the motor and its control-circuit elements. The effect of this filament circuit on the exciter lamp is therefore merely that of a resistance in shunt with the motor. The motor, in the instance here described, being of only about 1/80 horsepower, requires from 0.38 to 0.42 ampere, and the vacuum tube filament circuit requires about 0.3 ampere. The sum of these currents is sufficient current to operate the exciter lamp which may require 0.75 ampere, or slightly less. Thus, the motor and filament circuits in parallel function as a limiter resistance for the exciter lamp which, in this example, has but a 4-volt filament. Switch 18, operable from the front of panel 1, may be used to turn the motor on and off, and switch 16 to control the amplifier tubes and the exciter lamp.

It has been recognized that the operation of a talking motion picture projector on alternating and direct current introduces several problems, of which a difficult one is the supply of noise-free current to the exciter lamp, especially if a lamp of inexpensive type having but little heat inertia be employed. By connecting this lamp in the circuit of the series-wound motor not only is the current limited to the correct value, as explained above, thus eliminating the need for a special resistor or transformer, but also a more nearly uniform current is provided for the lamp when the projector is operating on alternating current. Although the theory is not at present understood, we have found by taking oscilloscope measurements of the potential across the exciter lamp connected as shown in Fig. 7, that the wave-form is greatly flattened out, especially on one side, and that as a result there is no noticeable hum or other noise from the loudspeaker due to current fluctuations in the power source at the lamp. The loudspeaker employed is preferably designed to cut off below about 80 cycles, so, since the wave-form change or rectification effected by the connections above described suppresses the 120 cycle fluctuation of the 60 cycle current, only the 60 cycle component remains, and this frequency is not reproduced by the loudspeaker. It is contemplated that the loudspeaker will usually be enclosed in a separate cabinet placed near the projection screen and be connected to a suitable receptacle 82 on the chassis 2.

The circuit connections for the projection lamp 5 as shown in Fig. 7 include the double-pole, single-throw toggle switch 18, closure of which connects the projection lamp and the motor across the power line. By employing a single switch for both purposes, the projection lamp cannot be lighted except when the motor and blower are running, which is an important safety factor because the projection lamp should not be lighted unless the blower is operating to cool the lamp.

The circuit arrangement of a suitable sound- or audio-frequency system is represented in Fig. 8 wherein three stages of audio-frequency amplification are shown. At the left of the diagram is represented a photoelectric cell or tube 9 coupled through a resistance-capacity coupling system to the input of the first amplifier stage which includes vacuum tube 10. The output of this first stage is coupled, again through a resistance-capacity coupling system, to the second stage which includes vacuum tube 11. This second coupling system also includes a low-frequency limiter, $R_5$, $C_3$, to compensate for the characteristic of the photoelectric cell 9 which tends to rise with impressed light fluctuations of decreasing frequency below about 200 cycles. The object of this compensator network is obviously to attain a more nearly uniform overall frequency characteristic, and therefore the specific design and connection thereof should be chosen to be appropriate to the particular type of photoelectric cell employed, as well as to other factors which would be evident to those skilled in the art. The network here illustrated employed a resistance of 0.25 megohm and a capacity of .002 microfarad. A volume control and coupling resistor $R_4$ is connected to the input of tube 11 through an adjustable contact 15. The manual control knob for this resistor is also marked "15" on panel 1 in Fig. 1. This element may for convenience comprise a combined rheostat and switch as shown in Fig. 8 and Fig. 1 by reference characters 15, 16, so that when the control knob is first turned the series-connected filaments or cathode heaters of the vacuum tubes are heated (see also Fig. 6) and thereafter further turning of the knob will control the amplification and thus the volume of sound from the loudspeaker 17.

The third stage of amplification comprises two tubes, 12 and 13, connected in push-pull and coupled to the output of tube 11 through a center-tapped choke 21. The output of this push-pull stage is coupled to loudspeaker 17 through a transformer 22 having a double primary. In order to simplify the system it is convenient to employ a loudspeaker of the permanent magnet type. The necessary direct-current supply for the anode circuits of the vacuum tubes is furnished through rectifier tube 14, and the output thereof is filtered by a suitable network of resistors $R_6$, $R_7$ and $R_8$ and of capacitors $C_6$, $C_7$ and $C_8$, as shown. These filter elements are connected not only so as to provide the filtering action for the direct-current power supply, but also to prevent undesired feedback couplings between stages.

To avoid any misunderstanding it should be noted that of the five vacuum tubes represented in the circuit diagram, Fig. 8, only three are shown in Fig. 2. This omission of tubes 12 and 13 in Fig. 2 was to avoid crowding in the drawing. In the preferred embodiment these tubes were located between tube 11 and motor 3, of Fig. 2.

It has been pointed out above that certain of the improvements in accordance with the present invention are useful not only in talking motion picture projectors, but in motion picture projectors of the silent or non-talking type. It will be obvious that certain of the improvements are likewise useful in sound-on-film reproducing apparatus when not combined with pictures.

We claim:

1. In a motion picture projector of the film type, the combination of a sprocket for driving the film, a flywheel, an axle upon which the flywheel is mounted, speed reduction gearing for driving said sprocket from the axle of the flywheel, mechanism operated from said flywheel axle to drive said film with an intermittent motion, a driving motor, a friction wheel attached to the shaft of said motor, said motor being pivotally mounted so that said friction wheel may be moved into and out of contact with said flywheel, a projection lamp, fan blades attached to the motor shaft, a duct for conducting to said lamp air propelled by said fan blades, and manually operable means for moving the motor about the axis of its pivotal mounting whereby said friction wheel may be moved out of contact with the flywheel to stop the motion of the film without stopping the operation of the fan blades.

2. In a motion picture projector of the film type, the combination of a sprocket for driving the film, a flywheel, an axle upon which the flywheel is mounted, speed reduction gearing for driving said sprocket from the axle of the flywheel, mechanism operated from said flywheel axle to drive said film with an intermittent motion, a driving motor, a friction wheel attached to the shaft of said motor, said motor being pivotally mounted so that said friction wheel may be moved into and out of contact with said flywheel, a projection lamp, a blower having blades attached to the motor shaft and having a stationary blower casing in which said blades operate, a duct for conducting air from the blower casing to said lamp to cool the same, and manually operable means for moving the motor about the axis of its pivotal mounting whereby said friction wheel may be moved out of contact with the flywheel to stop the motion of the film without stopping the operation of the blower.

3. In a motion picture projector of the film type, the combination of a vertical panel, a sprocket for driving the film positioned at one side of said panel and rotatable about an axis disposed at right angles to the panel, a combined flywheel and shutter positioned at the other side of said panel and in close proximity thereto, an axle upon which the flywheel is mounted disposed at right angles to said panel, speed reduction gearing for driving said sprocket from the axle of the flywheel, said gearing being interposed between the flywheel and said panel and comprising a chain of gears each of which lies in a plane which is parallel to the plane of the panel and the plane of the flywheel, mechanism operated from said flywheel axle to drive the film with an intermittent motion, a driving motor located to the rear of the flywheel and having a shaft disposed substantially at right angles to said panel, a friction wheel attached to the shaft of the motor, said motor being pivotally mounted so that said friction wheel may be moved into and out of contact with said flywheel, a projection lamp positioned behind the flywheel and shutter, a blower having blades attached to the motor shaft between the motor and said friction wheel, said blower also having a stationary blower casing in which said blades operate, a duct whose axis is substantially parallel to said panel for conducting air from the blower casing to said lamp to cool the same, and manually operable means for moving the motor about the axis of its pivotal mounting whereby said friction wheel may be moved out of contact with the flywheel to stop the motion of the film without stopping the operation of the blower.

4. In a motion picture projector according to claim 1, a heat filter movable to and from a position in which it intercepts light from said projection lamp, and connections between said manually operable means and the heat filter whereby actuation of said manually operable means to move the friction wheel into and out of contact with the flywheel also moves the heat filter out of and into its light intercepting position respectively.

5. In a motion picture projector of the film type, the combination of a vertical panel, a sprocket for driving the film, a combined flywheel and shutter positioned near the panel, an axle upon which the flywheel is mounted disposed at right angles to said panel, speed reduction gearing for driving said sprocket from the axle of the flywheel, mechanism operated from said flywheel axle to drive the film with an intermittent motion, a projection lamp positioned behind the flywheel and shutter, a driving motor having a shaft disposed substantially at right angles to said panel, a friction wheel attached to the shaft of the motor, a mounting for the motor movable about a vertical axis, manually operable means to move the motor-mounting and the motor about said vertical axis whereby said friction wheel may be moved into and out of contact with the flywheel, said means comprising a longitudinally movable member attached to the motor-mounting and extending through the vertical panel, a knob at the outer side of the panel and having threaded engagement with said member to move the same longitudinally, a heat filter movable to and from a position in which it intercepts light from said projection lamp, and connections between said heat filter and said knob whereby rotation of the latter to move the friction wheel into and out of contact with the flywheel also moves the heat filter out of and into its light intercepting position respectively.

6. In a motion picture projector of the film type, the combination of a sprocket for driving the film, a flywheel, an axle upon which the flywheel is mounted, speed reduction gearing for driving said sprocket from the axle of the flywheel, mechanism operated from said flywheel axle to drive said film with an intermittent motion, a driving motor, a friction wheel attached to the shaft of said motor, said motor being movably mounted with respect to the flywheel so that said friction wheel may be moved into and out of contact with the flywheel, a projection lamp, fan blades attached to the motor shaft, a duct for conducting to said lamp air propelled by said fan blades, and manually operable means for moving the motor whereby said friction wheel may be moved out of contact with the flywheel to stop the motion of the film without stopping the operation of the fan blades.

SAMUEL K. LACKOFF.
HARRY GORDON.